United States Patent [19]

Broding

[11] Patent Number: 5,001,676
[45] Date of Patent: Mar. 19, 1991

[54] ACOUSTIC BOREHOLE LOGGING

[75] Inventor: Robert A. Broding, Lakeland, Fla.

[73] Assignee: Mobil Oil Corporation, Fairfax, Va.

[21] Appl. No.: 515,996

[22] Filed: Apr. 27, 1990

[51] Int. Cl.$^5$ .............................................. G01V 1/00
[52] U.S. Cl. .................................... 367/31; 181/104
[58] Field of Search ............................... 181/102-106; 367/25, 35, 86, 911, 912, 31, 34

[56] References Cited

U.S. PATENT DOCUMENTS

| | | | |
|---|---|---|---|
| 3,406,779 | 10/1968 | Zemanek, Jr. | 181/0.5 |
| 3,406,780 | 10/1968 | Zemanek, Jr. | 181/0.5 |
| 3,503,038 | 3/1970 | Baldwin | 340/15.5 |
| 3,511,334 | 5/1970 | Zemanek, Jr. | 181/0.5 |
| 3,518,679 | 6/1970 | Baldwin et al. | 340/18 |
| 3,550,075 | 12/1970 | Hilchie et al. | 340/15.5 |
| 3,553,640 | 1/1971 | Zemanek, Jr. | 340/15.5 |
| 3,668,619 | 6/1972 | Dennis | 340/15.5 BH |
| 3,949,352 | 4/1976 | Vogel | 367/25 |
| 4,255,798 | 3/1981 | Havira | 367/35 |
| 4,641,724 | 2/1987 | Chow et al. | 181/104 |
| 4,852,069 | 7/1989 | Clerke et al. | 367/35 X |
| 4,885,723 | 12/1989 | Havira et al. | 367/35 |

OTHER PUBLICATIONS

Article entitled "Elastic Waves in Layered Media", by W. Maurice Ewing.
Society of Petroleum Engineers Article (SPE 15436) entitled "A Comparison of New Ultrasonic Cement and Casing Evaluation Logs with Standard Cement Bond Logs".
Article entitled "Ultrasonic Cement Bond Evaluation", by R. M. Havira, dated Mar. 18, 1982.

Primary Examiner—Brian S. Steinberger
Attorney, Agent, or Firm—Alexander J. McKillop; Charles J. Speciale; George W. Hager, Jr.

[57] ABSTRACT

A logging tool is lowered in a borehole. The tool is positioned so that the transducer is offset from the axis of the borehole. The transducer transmits acoustic energy such that it strikes the borehole wall or casing at an incident angle that directs reflections from the borehole wall away from the transducer and at the same time allows transmission into the surrounding formations or cement in the borehole annulas between the casing and the borehole wall. Reflections of the transmitted acoustic energy from anomalies within the surrounding formations as well as cement in the annulas are received by the transducer.

15 Claims, 4 Drawing Sheets

ACOUSTIC BOREHOLE LOGGING

BACKGROUND OF THE INVENTION

This invention relates generally to the acoustic logging of a subsurface formation penetrated by a borehole.

It is conventional practice to survey a subsurface formation surrounding a borehole by acoustic logging techniques in which acoustic signals are generated and received by a logging tool run through the borehole. One such survey involves the transmission and reception of directional acoustic signals, usually in a rotational mode about the borehole, in order to obtain an indication of the configuration of the borehole or the presence or absence of anomalies in the wall of the borehole or with the surrounding formations. Such an acoustic logging survey may be carried out utilizing separate transducers for transmission and reception, such as disclosed in U.S. Pat. Nos. 3,369,626; 3,371,319; 3,434,563; 3,434,568; 3,517,767; 3,728,672; 3,517,768; and 4,704,008, or by utilizing a single transducer, commonly termed a "transceiver", for both transmission and reception, such as disclosed in U.S. Pat. Nos. 3,406,779; 3,406,780; 3,503,038; 3,511,334; 3,518,679; 3,550,075; 3,553,640, and 3,668,619.

When utilizing separate directional transducers for transmission and reception it is necessary for best results to focus the transducers with regard to the formation being surveyed. For example, the transmitter and receiver are inclined toward one another in order that their respective directional transmission and reception paths meet on the wall of the borehole. While this presents no problem when logging a borehole of known and uniform diameter, in actual practice the borehole may vary considerably throughout the extent to which it is to be logged. Consequently, the use of separate transmitter and receiver oriented at a fixed focal distance may produce unacceptable results.

To avoid such an inherent disadvantage in the use of separate transmitting and receiving transducers, it has become the practice to utilize a single transducer, sometimes called a transceiver, for both transmission and reception of acoustic energy. The transducer is oriented within the borehole such that its directional transmission path is normal to the wall of the borehole. Since the transmitted acoustic energy strikes the wall of the borehole at an angle of incidence of zero or near zero, the reflected energy will travel along the same general path as the transmitted energy thus enabling a single logging run to be made in a borehole of varying diameter. This is the preferred method of logging whenever the intent is only to survey the borehole wall and the intent is not to survey beyond the borehole wall.

For investigating anomalies beyond the borehole wall, one problem encountered in logging with a single transducer for transmission and reception occurs in boreholes of high reflectivity or lined with well casing as is commonly done in hydrocarbon exploration and production. A strong primary acoustic reflection is developed from the normal incidence of the transmitted acoustic energy on the high reflectivity wall or well casing which, in combination with multiples of such reflection, interfere with the desired reflected acoustic signals from within the subsurface formations surrounding the borehole or from beyond the well casing.

In U.S. Pat. No. 4,255,798 to Havira an acoustic pulse technique for investigating casing and cement bond in a borehole is described wherein a plurality of transmitter/receiver transducers are used to direct acoustic pulses toward the casing and to receive the reflected signals. Each transducer is spaced around the circumference of the tool to examine different segments of the casing. The reflected signals consist of a large amplitude primary reflection caused by the acoustic discontinuity at the borehole fluid-casing interface followed by much smaller signal amplitudes representative of reverberations between the inner and outer walls of the casing. The amplitude of the smaller signal depends on the amount of energy leaked into the adjacent media. The total received signals are processed to determine the casing thickness or to evaluate the cement bond.

Commercial versions of this tool are described in papers entitled "Ultrasonic Cement Bond Evaluation" by R.M. Havira and published in the proceedings of the Society of Professional Well Logging Symposium, July 6-9 1982, paper N and "A Comparison of New Ultrasonic Cement and Casing Evaluation Logs with Standard Cement Bond Logs" by T. C. Sheives et al. and presented at the 61st Annual Technical Conference and Exhibition of the Society of Petroleum Engineers, Oct. 5-8, 1986, SPE paper 15436. The tools described have eight transducers spaced azimuthally to examine approximate 45 degree segments of the casing. None of the tools described measure directly the properties of the media surrounding the borehole. Only amplitudes and resonant frequencies are measured which are then related in some manner to the quality of the cement bond.

It is therefore an object of the present invention to provide for the acoustic logging of a borehole, particularly one lined with well casing, wherein the problem of borehole or casing primary and multiple reflections interfering with formation reflection signals is overcome or in the case of a cemented well casing the problem of primary and multiple reflections from the casing interfering with the imaging of voids and channels in the cement is overcome.

SUMMARY OF THE INVENTION

The present invention is directed to a method for the acoustic logging of a subsurface formation penetrated by a borehole. A logging tool having at least one acoustic transducer is lowered into the borehole to a formation of interest. The transducer transmits acoustic energy that strikes the borehole wall at an incident angle such that acoustic energy reflected from the borehole wall is directed away from the transducer. At the same time some of the acoustic energy passes into the surrounding medium and is reflected by anomalies within the medium back to the borehole. These anomaly reflections are received by the transducer as an indication of the internal structure or condition of the surrounding medium.

In a further aspect, the transducer is positioned so that it is offset from the axis of the borehole and it transmits acoustic energy in a beam focused at an angle to the direction of the offset. In a more specific aspect, the transducer is positioned such that the beam of acoustic energy is transmitted in a direction generally perpendicular to the offset.

In a still further aspect, a casing lined borehole is logged with the transducer positioned so that its transmitted beam of acoustic energy strikes the casing at an incident angle that deviates from the normal to such an extent that any direct reflection of acoustic energy in the form of compressional waves is directed away from the transducer and any transmission of acoustic energy through and beyond the casing is by way of conversion to shear waves within the casing and then conversion of such shear waves back to compressional waves as they exit the casing. The transducer receives any acoustic energy returning through the casing by way of reflection of the converted compressional waves from anomalies outside the casing. Preferably the incident angle to the casing exceeds a first critical angle above which there is no transmission of compressional wave acoustic energy into the casing and is less than a second critical angle above which there is no transmission of shear wave acoustic energy through the casing.

In a yet further aspect, the reflection of acoustic energy from the borehole wall is directed along a path around the inside of the borehole which provides for multiple reflections of such acoustic energy between an absorbing material and the borehole wall. The reflectance angle of the multiple reflections of acoustic energy with the absorption material is progressively increased, such as exponentially, and is always greater than the angle of incidence with the borehole wall.

DESCRIPTION OF THE PREFERRED EMBODIMENT

Figure 1:
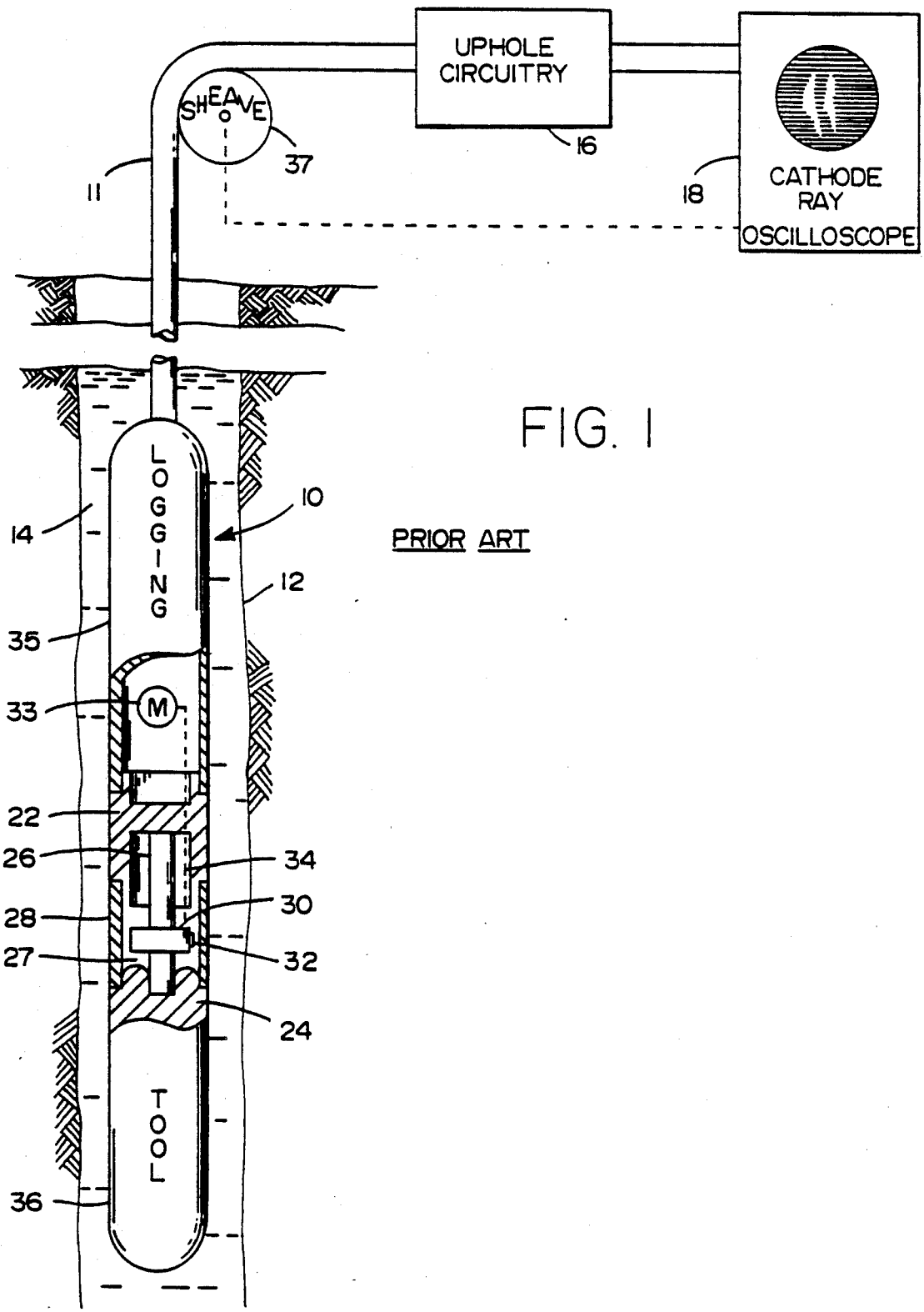
FIG. 1 illustrates a typical borehole logging system with which the acoustic logging of a subsurface formation may be carried out in accordance with the present invention.

Referring to FIG. 1, there will be briefly described a borehole logging system with which the acoustic logging of a subsurface formation may be carried out in accordance with the present invention. The system includes an elongated logging tool 10 which is shown as extended from a cable 11 within a borehole 12. The borehole 12 is filled with a fluid such as a drilling mud 14. The logging system also includes remote circuitry 16 at the surface and a suitable display means 18, such as a cathode ray oscilloscope upon which a facsimile of the subsurface formation surrounding the borehole may be displayed.

The logging tool 10 includes upper and lower support panels 22 and 24 and a reduced connecting member 26 extending between the panels. The panels 22 and 24 define a compartment 27 within which an acoustic transducer 32 is mounted. Compartment 27 is provided with a peripheral window 28 which is relatively transparent to acoustic energy. The compartment is filled with a suitable coupling liquid which prevents the window 28 from collapsing under the hydrostatic head of the borehole fluid 14 and which desirably has an acoustic impedance close to that of the borehole fluid 14 and the window 28. A transducer support 30 is mounted in the compartment 27 for rotational movement about the shaft member 26. the acoustic transducer 32 is firmly mounted on the support 30.

The logging tool 10 is also provided with a prime mover 33 such as an electric motor. A drive mechanism indicated by the broken line 34 interconnects the prime mover and support 30 so that transducer 32 may be rotated through a 360° scan of the borehole. The upper and lower sections 35 and 36, respectively, of the logging tool may be provided with suitable centralizing means (not shown) for positioning the tool within the borehole.

Such a borehole logging tool 10 is fully described in the aforementioned U.S. Pat. No. 3,511,334 and reference may be made to such patent for a detailed description of the mode of operation of such tool during the acoustic logging of the borehole and surrounding formations, the teachings of which are incorporated herein by reference. Briefly however, the logging tool 10 is lowered into the borehole 12 and the prime mover 33 is energized to rotate the transducer assembly 30 about the member 26. The acoustic transducer 32 is excited to generate pulses of acoustic energy which travel predominantly in a confined narrow beam path toward the wall of the borehole 12. Acoustic transducer 32 may, by way of example, be a piezoelectric or bender-type transducer generating pulses of acoustic energy having a predominant frequency within the range of a few hertz to one-to-two megahertz. Such a transducer is illustrated and described in U.S. Pat. No. 4,649,525 to Angona and Zemanek, the teaching of which is incorporated herein by reference. The transducer 32 may be rotated at 100 to 400 revolutions per minute and may be pulsed at a repetition rate on the order of 2,000 times per second. The acoustic energy reflected from the wall of the borehole and from the surrounding formation is detected by the transducer and converted into electrical signals which are transmitted to the surface by way of suitable communication channels in the cable 11 where they are received by uphole circuitry 16 which functions to modulate the beam of the cathode ray oscilloscope 18 with such electric signals. The logging tool 10 also is provided with position indicating means (not shown) which functions to transmit a position signal to the surface which is representative of the angular position of the transducer 32 within the borehole. The position signal operates to horizontally sweep the oscilloscope beam across the face or the oscilloscope in proportion to the angular position of the transducer in the borehole. As the logging tool is moved upwardly through the borehole, a depth indicating means, such as a measuring sheave 37, is rotated by cable 11 and generates a depth signal which functions to control the sweep of the oscilloscope beam vertically across the face of the oscilloscope.

From the foregoing description it will be recognized that as the logging tool is moved upwardly or downwardly through the borehole and the transducer is rotated, a display is produced on the face of the oscilloscope which is correlated with depth of the logging tool within the borehole. Whenever the beam of acoustic energy transmitted from the transducer encounters an anomaly in the wall of the borehole or within the formation, such as a fracture for example, the beam is not reflected directly back to the transducer and the beam on the face of the oscilloscope is not intensity modulated. A gap is indicated on the face of the oscilloscope identifying the presence of the anomaly in the wall of the borehole or within the surrounding formation.

Figures 2, 3:
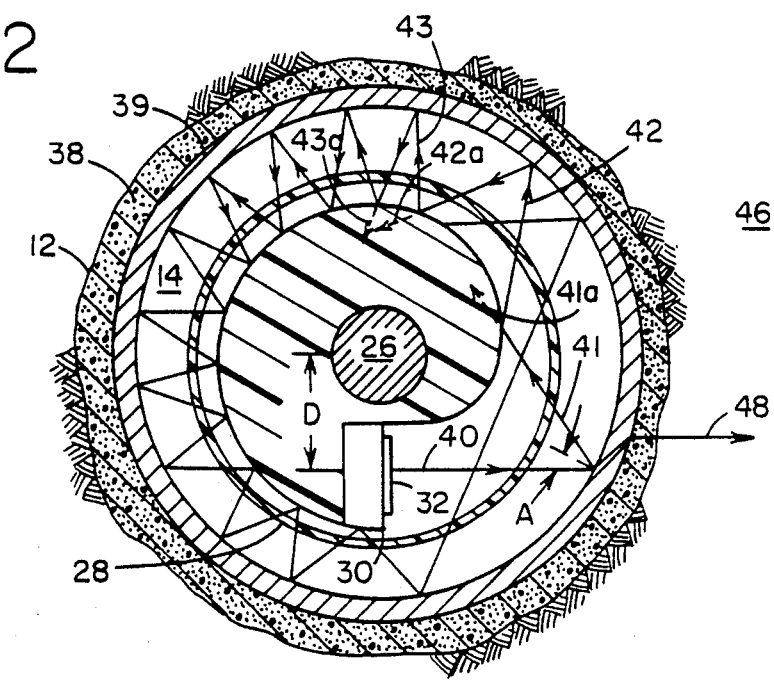
FIG. 2 is a cross-sectional view of a cased borehole being logged with the borehole logging system of FIG. 1 in accordance with the present invention.
FIG. 3 illustrates various acoustic energy travel paths for a cased borehole being logged with the borehole logging system of FIG. 2.

Although the borehole logging system of FIG. 1 has been shown in an uncased borehole, such system is utilized in accordance with the present invention in either a cased or an uncased borehole. In an uncased borehole having a high reflectivity wall or in a cased borehole, primary and multiple reflections from the borehole wall or the well casing can be reflected back to the acoustic transducer and interfere with the reflection signals returning from within the formation surrounding the borehole. It is the specific object of the present invention to eliminate such unwanted primary and multiple borehole reflections by directing their reflective paths away from the transducer as will hereinafter be described in conjunction with the accompanying FIGS., which for purposes of example and description show the borehole to be lined with well casing. Referring now to FIG. 2, the acoustic transducer of the present invention provides for elimination of such interfering casing reflections by offsetting the transducer 32 from the axis of the well casing 39 and cement sheath 38 and focusing the beam of acoustic energy along path 40 from the transducer 32 at an angle, preferably 90°, to the direction of such offset D so that the transmitted acoustic energy strikes the well casing 39 at the incident angle A from the normal. Upon striking the casing the acoustic energy is converted to a reflected wave and possibly waves refracted into the casing. With this configuration the primary casing reflection travels along path 41 and subsequent casing multiple reflections travel along paths 42 and 43. In this manner they either (i) do not return to the transducer 32 but travel around the inside of the casing with decreasing magnitude with each subsequent reflection until there is complete absorption along paths 41a, 42i a and 43a within an acoustic energy absorber 44 surrounding the shaft 26 or (ii) are received at the transducer 32 a sufficiently long period of time after transducer excitation such that they do not interfere with reflection signals returning from beyond the well casing.

The partition of energy when a compressional wave propagating in water strikes a water-steel interface at some incident angle from the normal to the interface is explained in detail in the book "Elastic Waves in Layered Media", by M. Ewing, W. Jardetsky, and F. Press, McGraw-Hill 1957, pp. 79-89. For angles of incidence greater than zero but less than a critical angle, A1 (defined below), a portion of the incident wave energy is reflected back into the water as a compressional wave, and the remainder of the incident wave energy is refracted into the steel as two waves: a compressional wave and a shear wave. This is illustrated in FIGS. 3-7 and 3-8 of the aforementioned book.

The refracted compressional and shear waves in the steel leave the water-steel interface at differing angles of refraction according to Snell's law.

Referring to FIG. 3, which shows the details of the angles of incidence and refraction at the water-steel interface, the incident energy is partitioned among a reflected compressional wave which travels along path 41 and refracted compressional and shear waves which travel in the steel along paths 49 and 47, respectively, and emerge into the steel at angles of refraction A2 and A3, respectively.

For the refracted compressional wave, Snell's law is defined as $$(\sin A1/\sin A2) = C1/C2 \tag{1}$$

where C1 and C2 are the velocities of compressional waves in the water and steel, respectively.

In equation (1), because C2 is greater than C1 (typically C1=4900 feet/second and C2=19520 feet/second), A2 is always greater than A1. For A2 =90 degrees, the energy of the refracted compressional wave is zero, and only a refracted shear wave will propagate in the steel. At this angle, since sin A2=sin 90 and sin 90=1, A1 is defined as the first critical angle, Ac1, by the relationship $$\sin Ac1 = C/C2. \tag{2}$$

For the typical water-steel interface $$Ac1 = 14.5 \text{ degrees.}$$

For the refracted shear wave, Snell's law becomes $$(\sin A1/\sin A3) = C1/C3 \tag{3}$$

where A3 is the angle of refraction for the refracted shear wave and C3 is the velocity of shear waves in steel.

For incident angles greater than Ac1 but less than a second critical angle, Ac2, a shear wave will continue to propagate in the steel. For steel, C3 is greater than C1 (typically, C3=10630 feet/second); therefore, from equation (3) it can be seen that A3 is always greater than A1. For A3=90 degrees, the energy of the refracted shear is zero, and all the incident compressional energy is reflected from the casing back into the fluid. Therefore, for A3=90 degrees, the second critical angle is defined from equation (3) as $$\sin Ac2 = C1/C3. \tag{4}$$

For the typical water-steel interface $$Ac2 = 27.4 \text{ degrees.}$$

There is thus defined a window of incident angles of preferred operation such that the incident angle A1 satisfies the inequality $$Ac1 < A1 < Ac2. \tag{5}$$

It is within this window of operation that only shear waves propagate inside the steel casing, and no compressional waves propagate therein. It has been found that when operation is within this window, there is less interference from refracted compressional waves. Such interference may arise from reflection of the compressional wave from imperfections in the casing or on the surface of the casing.

Windows of operation for various liquid-steel interfaces are listed in the table below.

| INTERFACE | WINDOW |
| --- | --- |
| fresh water-steel | 14.5 < A1 < 27.4 |
| salt water-steel | 15.7 < A1 < 29.8 |
| oil-steel | 13.6 < A1 < 25.6 |

It would seem that the preferred angle of incidence, A1, should be only slightly greater than first critical angle Ac1; however, it has been found that satisfactory operation is even obtained when A1 is slightly greater than the maximum angle indicated in the table alone. It is also, however, recognized that operation may be carried out at angles smaller than Ac1 such that the reflected compressional is reflected away from the transducer wave does not interfere with the reception of reflections from anomalies beyond the steel casing.

As can be seen in FIGS. 2 and 3, when a compressional wave strikes a steel casing at an angle within the window of operation defined above, it generates a reflected compressional as well as a refracted shear wave. This shear wave travels in the steel casing 39 along path 47 and on intercepting the outer surface of the casing converts to a reflected shear wave that remains in the casing and a transmitted compressional wave that then travels along path 48 into the surrounding cement sheath 38 in a direction which due to the curvature of the casing and differences in acoustic properties between the cement sheath 38 and the borehole liquid 14 is only slightly different than parallel to the incident path 40. As this transmitted compressional wave strikes an anomaly in the cement sheath 38 or travels through the cement sheath 38 and strikes an anomaly in the formation such as a fracture, it will be reflected back to the transducer 32 along the same paths 48, 47, and 40 because of Snell's law but in opposite direction to that shown by the arrowheads in FIGS. 2 and 3. Consequently, only reflected acoustic energy from beyond the well casing 39 is detected by the transducer 32.

Referring again to the absorber 44, its outer surface is of non-circular curvature to provide for an angle of reflectance that is always greater than the angle of incidence for the inner surface of well casing 39. Preferably such curvature provides for an increasing reflectance angle for each multiple reflection of acoustic energy. An exponential curvature will provide for an exponentially increasing reflectance angle for example. This ensures that the reflected compression wave, initially as a primary reflection and thereafter as multiple reflections, will continue around the inside of the well casing away from the transducer until there is complete absorption within absorber 44. Examples of materials acceptable for use as the absorber 44 are Teflon, lead, and tungsten loaded epoxy.

In one embodiment of the present invention for use in a 6¾ inch well casing, the acoustic transducer is offset 1½ inches from the axis of shaft 26 and its transmitted acoustic energy beam is in a direction perpendicular to the direction of such offset such that the angle of incidence of such beam with the well casing is 30° from the normal.

In addition to the configuration of FIG. 2, at least the outer surface of the absorber 44 may comprise a material for direct absorption and/or diffusion of the primary casing reflection traveling along the path 41 so as to minimize subsequent casing multiple reflections traveling along paths 42 and 43. Any such multiple reflections would be in a direction away from the transducer 32. Also stray reflections are also minimized by the use of a diffuser. One form of a diffuser is a round rod placed in the path of the reflected wave with its axis at an angle near 90 degrees to the beam. This scatters the energy from the rod surface perpendicular to the beam or away from the return path so that it no longer is a large coherent signal to interfere with the desired anomaly reflections. It has been shown that the signal-to-noise ratio from simple reflections is at least −30db over a window of 50 to 300 microseconds travel time.

Figure 4:
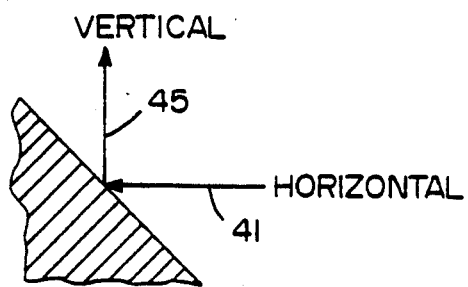
FIGS. 4-8 illustrate various alternate embodiments along with acoustic energy travel paths to that illustrated in FIGS. 2 and 3.

In an alternate embodiment, the absorber 44 may be replaced by a plane deflector within the travel path 41 to deflect the primary casing reflection in a generally vertical direction upwardly or downwardly along the borehole such that any return to transducer 32 is greater in time than the time to observe desired anomalies from beyond the well casing. FIG. 4 illustrates such a vertical deflection path 45 upwardly along the tool axis away from the transducer 32.

Figure 5:
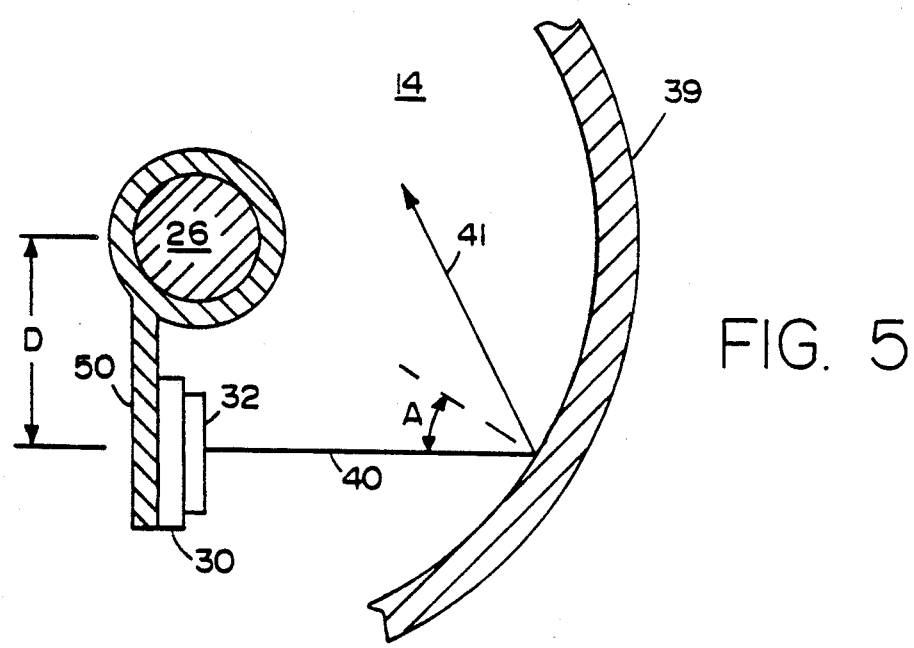

In a yet further embodiment illustrated in FIG. 5 the acoustic energy absorber 44 may be replaced by a rotor arm 50 to direct the primary casing reflection traveling along path 41 into the transducer cavity of borehole 10 away from transducer 32. It has been found that this provides for sufficiently long time delays which are longer than the time to observe desired anomalies from beyond the well casing.

To achieve the desired operating angle for the embodiments of FIGS. 2 and 5, the offset D shown in FIG. 5 must be adjusted for a particular inside radius of the steel well casing. The relationship between the offset D, the inside casing radius R, and the desired incident angle A1, is $$\sin A1 = D/R \qquad (6)$$

Figure 6:
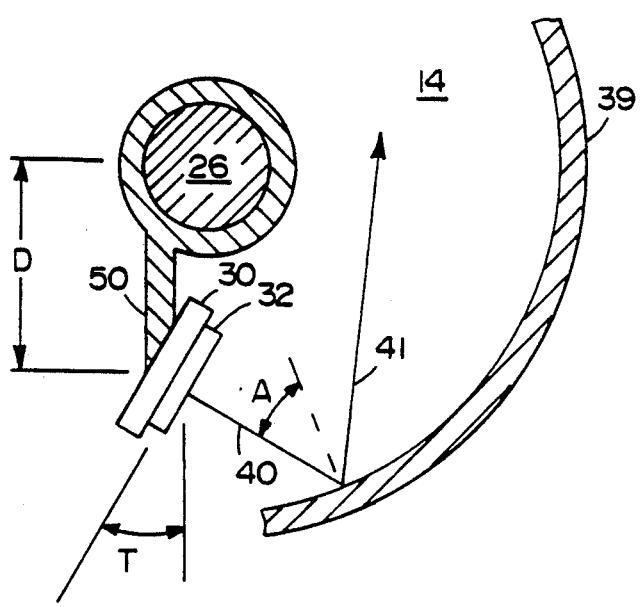

If it is desired to survey a smaller size well casing of radius Rs, after the offset has been set for an optimum angle of operation in a casing of inside radius R, the transducer must be tilted to achieve the optimum operating angle. This is shown in FIG. 6 where the tilt angle is T. The relationship which determines the amount of the tilt angle is $$\cos T = (Rs/D) \sin A1 = Rs/R \qquad (7)$$

where R is the inside radius of the original larger casing, Rs is the inside radius of the smaller casing, and D is the offset calculated for optimum angle of operation, A1, according to equation (6) in a casing with inside radius R. This relationship is valid only for the condition that Rs < R.

Figure 7:
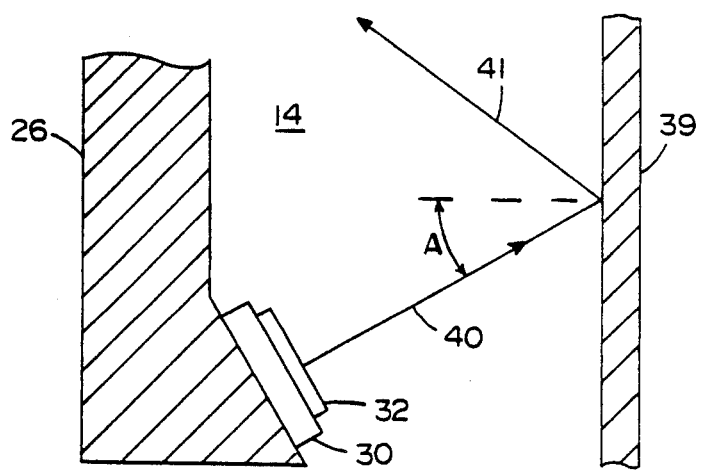

In a still further embodiment of FIG. 7 there is shown in cross section a vertical plane through the center line of the borehole tool and the well casing. The transducer 32 is positioned just as for that shown in FIG. 1 except that it is tilted at an angle A with respect to the normal to the axis of the tool so as to provide a vertically directive component to acoustic energy reflection 41 from the well casing so that it traverses up the borehole and away from transducer 32. A downward directivity could also be utilized. By operating in this manner, all of the advantages of the previously described configurations are obtained.

While all of the embodiments have been shown using a single transducer, it should be obvious that a plurality of fixed transducers spaced azimuthally and each having the property of being tilted with respect to a normal to the well casing or to the borehole wall performs to eliminate the undesirable large first reflection and allows for examination of the desirable anomaly reflections from beyond the well casing or beyond the borehole wall.

Figure 8:
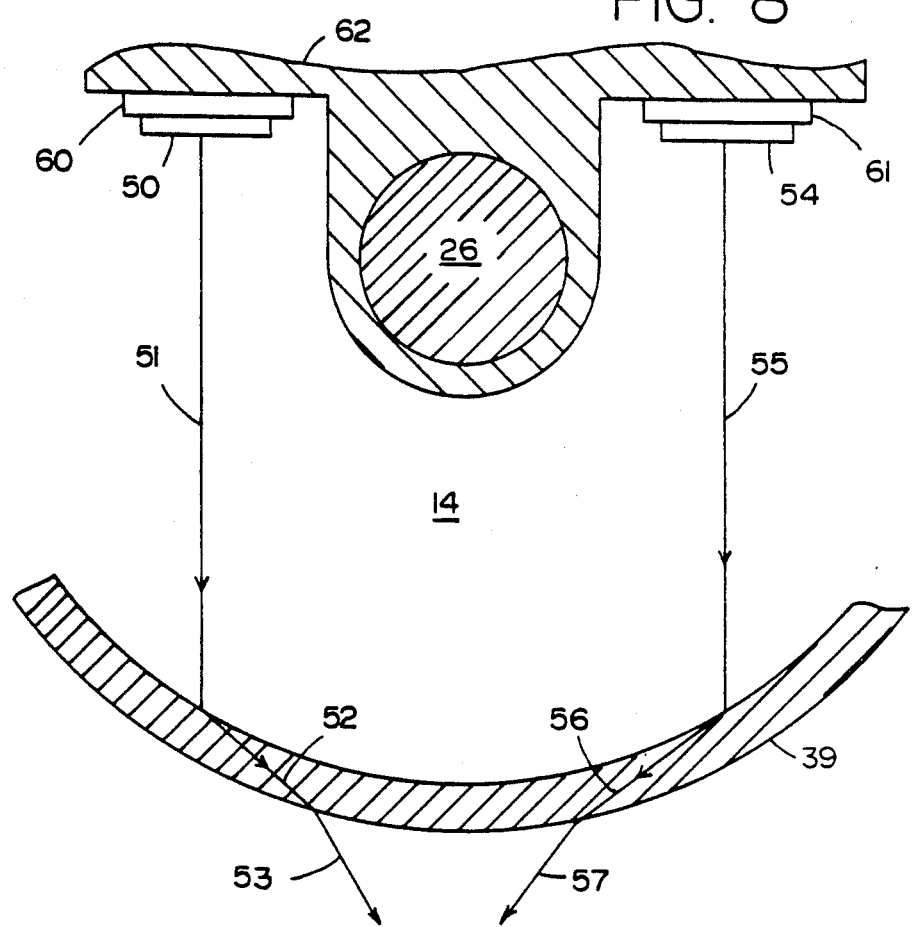

In a yet further configuration, FIG. 8 illustrates a pair of acoustic transducers located at the same axial position about the shaft 26 of the logging tool 10 and fixed to focus their beams of acoustic energy so as to illuminate a single formation target from differing directions. A first acoustic energy beam travels along path 51 from transducer 50 mounted on supports 60 and 62 so as to strike well casing 39 at an incident angle from the normal, passes through casing 39 along path 52 and into the formation surrounding the casing along path 53. Similarly, a second acoustic energy beam travels along path 55 from transducer 54 mounted on supports 61 and 62 so as to strike well casing 39 at an incident angle from the normal, passes through casing 39 along path 56 and into the surrounding formation along path 57. In this manner, a formation anomaly in the area of the intersection of paths 53 and 57 is simultaneously illuminated from differing directions. Consequently, acoustic energy reflections from the simultaneously illuminated formation anomaly are received by said transducers to provide for a dual imaging of such anomaly.

Having now described a preferred embodiment of the present invention, it is to be further understood that various modifications and changes may be made to the acoustic borehole logging method and system of the present invention without departing from the spirit and scope of the invention as set forth in the appended claims.

I claim:

1. A method for the acoustic logging of a subsurface formation penetrated by a borehole lined with well casing, comprising the steps of:
   (a) locating within said well casing a logging tool having a transducer for transmitting and receiving acoustic energy,
   (b) positioning said transducer at an offset from the axis of said well casing,
   (c) transmitting compressional wave acoustic energy from said transducer in a beam that strikes said well casing within a range of incident angles bounded by a first critical angle above which there is no transmission of refracted compressional wave acoustic energy through said well casing and by a second critical angle below which there is transmission of refracted shear wave acoustic energy through said well casing such that direct reflection of said transmitted compressional wave acoustic energy from said well casing is in the form of reflected compressional waves directed away from said transducer and transmission of said acoustic energy through and beyond said well casing is by way of conversion of said transmitted compressional wave energy to refracted shear waves within said well casing and then conversion of said refracted shear waves to refracted compressional waves as they exit said well casing, and
   (d) receiving acoustic returning to said transducer through said well casing by way of reflection of said refracted compressional waves from anomalies outside said well casing.

2. The method of claim 1 wherein said well casing comprises steel and said range of incident angles is bounded by first and second critical angles of about 14.5° and 27.4° respectively for a fresh water-steel casing interface within said borehole.

3. The method of claim 1 further comprising the step of directing said reflected compressional waves from said well casing to an absorbing material positioned within said tool which provides for multiple reflections of said reflected compressional waves between said absorbing material and said well casing along a path around the inside of the borehole.

4. The method of claim 3 further comprising the step of progressively increasing the reflectance angle of said multiple reflections of said reflected compressional waves with said absorbing material.

5. The method of claim 4 wherein the reflectance angle of said multiple reflections of said reflected compressional waves with said absorbing material is increased exponentially.

6. The method of claim 3 wherein the angle of reflectance of each of said multiple reflections with said absorbing material is always greater than the angle of incidence of each of said multiple reflections with said well casing.

7. The method of claim 1 further comprising the step of directing said reflected compressional waves from said well casing along a path inside the borehole to an absorbing material which completely absorbs said reflected compressional wave acoustic energy and prevents multiple reflections of said reflected compressional waves within said well casing.

8. The method of claim 1 wherein said well casing comprises steel and said range of incident angles is bounded by first and second critical angles of about 15.7° and 29.9° respectively for a salt water-steel casing interface within said borehole.

9. The method of claim 1 wherein said well casing comprises steel and said range of incident angles is bounded by first and second critical angles of about 13.6° and 25.6° respectively for an oil-steel casing interface within said borehole.

10. In an acoustic logging tool adapted to be moved through a borehole lined with well casing, the combination comprising:
    (a) a housing providing a compartment for an acoustic transducer,
    (b) a window in said housing which is transparent to the transmission of acoustic energy, and
    (c) an acoustic transducer mounted within said compartment at an offset from the axis of said housing and oriented so as to transmit a beam of compressional wave acoustic energy through said window that strikes said well casing within a range of incident angles bounded by a first critical angle above which there is no transmission of refracted compressional wave acoustic energy through said well casing and by a second critical angle below which there is transmission of refracted shear wave acoustic energy through said well casing such that direct reflection of said transmitted compressional wave acoustic energy from said well casing is in the form of reflected compressional waves directed away from said transducer and transmission of said acoustic energy through and beyond said well casing is by way of conversion of said transmitted compresssional wave energy to refracted shear waves within said well casing and then conversion of said refracted shear waves to refracted compressional waves as they exit said well casing, and to receive acoustic energy that has returned to said transducer by reflection from anomalies beyond said well casing.

11. The acoustic logging tool of claim 10 further comprising an acoustic energy absorbing material positioned about the axis of said housing so as to provide a pathway for multiple reflections of said acoustic energy between the borehole wall and said absorbing material around the inside of the borehole leading in a direction away from said transducer.

12. The acoustic logging tool of claim 11 wherein the thickness of said absorbing material about the axis of said housing progressively varies in a direction leading away from said transducer.

13. The acoustic logging tool of claim 11 wherein the thickness of said absorbing material about the axis of said housing varies exponentially.

14. The acoustic logging tool of claim 11 wherein the thickness of said absorbing material about the axis of said housing progressively varies such that the angle of reflectance of multiple reflections of said reflected compressional waves between the outer surface of said absorbing material and said well casing is always greater than the angle of incidence of said multiple reflections with said well casing.

15. The acoustic logging tool of claim 11 wherein said absorbing material extends along said offset between the axis of said housing and said transducer and progressively increases in thickness about said axis in an axial direction leading away from the direction of said offset.

* * * * *